US010887279B2

(12) United States Patent
Sandholm et al.

(10) Patent No.: US 10,887,279 B2
(45) Date of Patent: *Jan. 5, 2021

(54) SCALABLE CLOUD HOSTED METADATA SERVICE

(71) Applicant: EMC IP Holding Company LLC, Hopkinton, MA (US)

(72) Inventors: Thomas Sandholm, Mountain View, CA (US); Julio Lopez, Mountain View, CA (US); Vaibhav Kamra, Sunnyvale, CA (US); Niraj Tolia, Los Altos, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,737

(22) Filed: Aug. 26, 2019

(65) Prior Publication Data

US 2020/0145374 A1 May 7, 2020

Related U.S. Application Data

(63) Continuation of application No. 15/390,291, filed on Dec. 23, 2016, now Pat. No. 10,397,185.

(51) Int. Cl.
*H04L 29/06* (2006.01)
*H04L 29/08* (2006.01)

(52) U.S. Cl.
CPC ........ *H04L 63/0209* (2013.01); *H04L 63/101* (2013.01); *H04L 63/102* (2013.01); *H04L 67/1097* (2013.01); *H04L 67/142* (2013.01)

(58) Field of Classification Search
CPC ............. H04L 63/0209; H04L 63/0281; H04L 63/102; H04L 2209/76; H04P 29/06619
See application file for complete search history.

(56) References Cited

U.S. PATENT DOCUMENTS

| | | | | |
|---|---|---|---|---|
| 6,134,596 A | * | 10/2000 | Bolosky | H04L 29/06 348/E5.008 |
| 6,336,135 B1 | * | 1/2002 | Niblett | G06F 9/546 709/215 |
| 6,401,126 B1 | * | 6/2002 | Douceur | H04L 29/06 348/E5.008 |
| 7,240,100 B1 | * | 7/2007 | Wein | H04L 63/08 709/214 |
| 7,788,386 B2 | | 8/2010 | Svensson | |
| 8,423,662 B1 | * | 4/2013 | Weihl | H04L 65/1086 709/238 |

(Continued)

OTHER PUBLICATIONS

Adler, Distributed Coordination Models for Client/Server Computing, Computer (vol. 28, Issue 4, Apr. 1995) pp. 14-22. (Year: 1995).

*Primary Examiner* — Sher A Khan
(74) *Attorney, Agent, or Firm* — Workman Nydegger

(57) ABSTRACT

Systems and methods for protecting and deduplicating streams of data in a cloud based platform. A platform is configured with multiple services and can communicate with multiple clients. The platform receives all requests at an endpoint and distributes the requests to workers using multiple queues. The platform may be stateless and is scalable. The meta-data is handled separately from the data in one example.

20 Claims, 7 Drawing Sheets

(56) References Cited

U.S. PATENT DOCUMENTS

| | | | |
|---|---|---|---|
| 2002/0078209 A1* | 6/2002 | Peng | H04L 67/101 |
| | | | 709/227 |
| 2002/0087704 A1 | 7/2002 | Chesnais | |
| 2009/0022072 A1* | 1/2009 | Zhu | H04L 12/1813 |
| | | | 370/260 |
| 2009/0055552 A1 | 2/2009 | Swildens | |
| 2010/0128722 A1* | 5/2010 | Madour | H04L 12/66 |
| | | | 370/352 |
| 2011/0138064 A1* | 6/2011 | Rieger | H04N 21/433 |
| | | | 709/228 |
| 2011/0167105 A1* | 7/2011 | Ramakrishnan | G06Q 10/10 |
| | | | 709/203 |
| 2011/0302617 A1* | 12/2011 | Greenfield | H04N 7/17336 |
| | | | 725/96 |
| 2017/0046134 A1* | 2/2017 | Straub | G06F 8/31 |

* cited by examiner

SCALABLE CLOUD HOSTED METADATA SERVICE

BACKGROUND OF THE INVENTION

1. The Field of the Invention

Embodiments of the invention relate to systems and methods for protecting data. More particularly, embodiments of the invention relate to a cloud-hosted, scalable meta data service for backup streams.

2. The Relevant Technology

People, businesses and other entities rely on data more than ever for many reasons. Much of the data used in conducting and managing everyday business and everyday transactions is electronic in nature. As a result, failing to protect that data is a mistake that could have significant consequences. The need to protect data is also complicated by the fact that the amount of data to be protected is continually growing. In addition, the data to be protected is associated with metadata that also requires protection and that requires processing.

Data can be protected in a variety of different ways. Data can be backed up on-site, for example, and replicated to the cloud. Data can be directly backed up to the cloud. In yet another example, the data and the applications exist in the cloud and may need to be backed up in the cloud.

Cloud services are a new way to consume IT-resources and services. The cloud is highly available and requires little configuration from a user perspective. These properties make the cloud attractive for many reasons including for backing up and, if necessary, recovering an ever-growing stream of data. The amount of data that is backed up in the cloud, however, needs to be managed. Systems and methods are needed such that data and its associated metadata can be processed in an efficient and scalable manner.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE PREFERRED EMBODIMENTS

Figure 1:
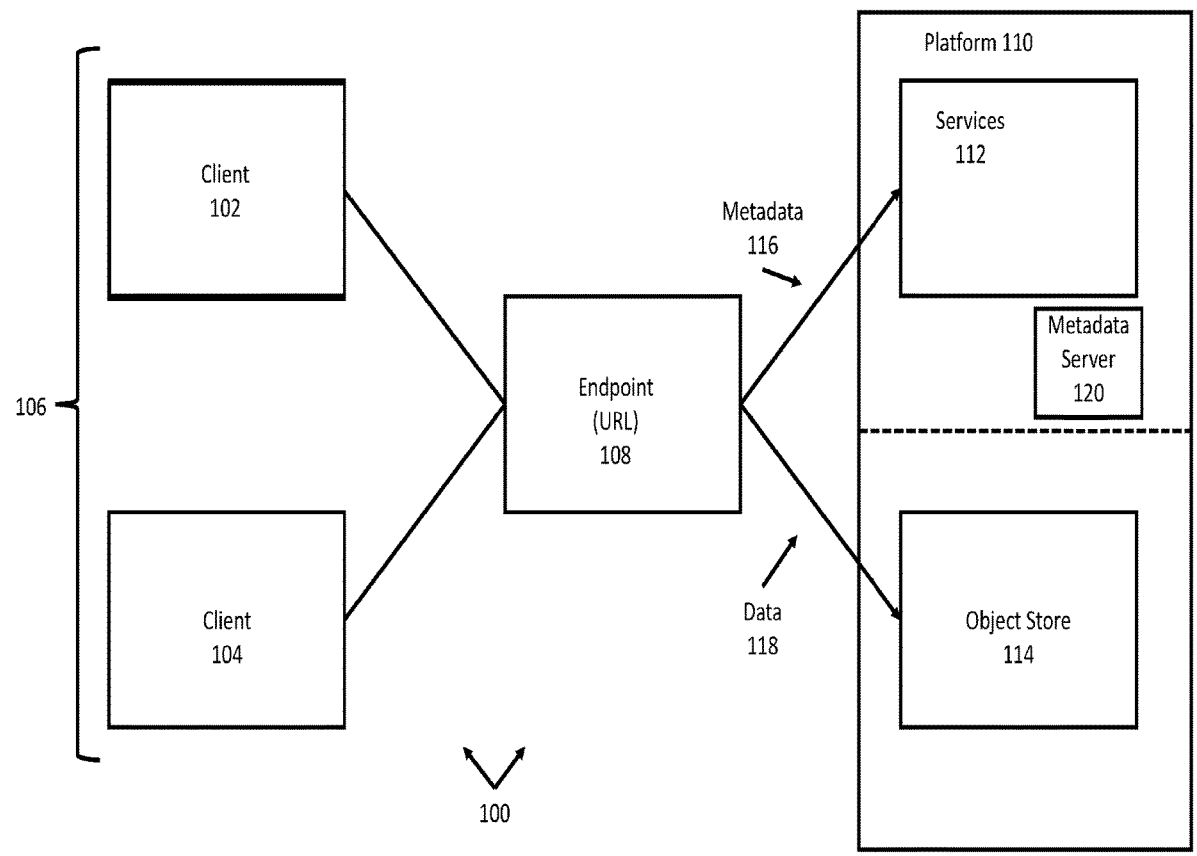
FIG. 1 illustrates an example of a cloud based platform configured to store data and configured to provide meta-data services.

Embodiments of the invention relate to systems and methods for protecting data and more particularly to a cloud-based service that provides data protection services. The data protection services include a meta-data service that handles requests related to the meta-data. The data may be handled in a separate path in the platform.

Embodiments of the invention provide data protection services without the need to deploy physical or virtual appliances. The services are scalable and can adapt to a large number of clients. In one example, the data protection service may be implemented as a cloud platform that includes services or micro services that allow clients to perform data protection operations (or other data operations). Embodiments of the invention provide an elastic, multi-tenant cloud service, which automates provisioning and offers transparent scale-out within the cloud based data protection platform.

The data protection platform offers an interface (e.g., an API) to perform actions that may include creating and recovering backup streams including immutable backup streams. The cloud based platform may provide, by way of example, a single endpoint (e.g., URL (Uniform Resource Locator)) across all deployments. A meta-data service may run on a shared infrastructure in the cloud.

The cloud-based platform may be associated with a data path and a meta-data path, which paths may be separate from each other. The meta-data path or the meta-data service is configured to serve all clients. However, the data and meta-data of a particular tenant (which may be associated with multiple clients) may be kept separately in the platform. Embodiments of the invention are from a situation where a meta-data service may serve a single deployed physical or virtual appliance. As a result, embodiments of the invention allow for a global namespace, and for global de-duplication across a single tenant or across multiple tenants. This simplifies management of files with a tenant (which may be associated with multiple clients in multiple locations as previously stated) and provides an improved de-duplication ratio because the platform is operating globally for the tenant. When operating globally, for all clients of a tenant, for example, the load on the meta-data service increases. Embodiments of the invention enable a scalable meta-data service that can scale to the size of the tenant or of multiple tenants. Embodiments of the invention relate to a meta-data service that can provide a large-scale cloud-based platform that may have millions of users.

In one example, a customer may include a backup system that includes a backup server. The backup server may prepare or organize the files as backup sets. The meta-data associated with these backup sets may be stored by a catalog service. The data of the backup sets may be written to the platform or to cloud-based storage by a client. In one embodiment, no filesystem need be mounted and writes may be performed in batches.

Because the catalog service performs bookkeeping related to the metadata, the platform can be configured to be scalable and satisfy availability requirements. This allows less meta-data to be stored. In one example, the minimal amount of meta-data necessary to write and read streams of data (e.g., files or data). In one example, this may include storing access control lists (ACLs) for streams and deduplication-related meta-data. The remaining meta-data can be managed by the catalog service.

The object store, which stores the data, can be accessed by unique handles or IDs that are generated by the platform and associated with the streams in the data store. During use of the platform, the client may perform some source-side deduplication and enable efficient cloud storage over wide area networks. Meta-data operations can be performed in large batches. The meta-data may not be fully contained and secured by internal firewalls because the meta-data is transferred or written to the cloud. In one example, the meta-data may be encrypted. Clients may need to provide a asymmetric public key mapped to a local private key to unlock or access the meta-data in the cloud.

Embodiments of the invention enable transparent capacity scaling for each tenant. Further, the platform may operate as a service. In one embodiment, the platform code may include a plurality of micro services that may be running primarily in containers.

The meta-data store or storage may be elastic and be allowed to scale out. Thus, there may be not fixed limit for how large a namespace capacity may be. Rather, nodes for storing the data can be added as necessary. Further, because the platform may serve all clients through a common endpoint, the platform may provide multiple instances of the service that can serve clients concurrently and independently. Throughput is one goal, which includes the ability to batch and call the service with an asynchronous interface. Tenants may be performance isolated, and have the ability to request higher throughput and availability. If one component fails another component can pick up and complete the request. These and other aspects of embodiments of the invention are described with reference to the Figures.

FIG. 1 illustrates an example of a system 100 that includes a cloud based platform 110. The platform 110 is associated with and used by clients 106, represented as clients 102 and 104. The platform 110 may support multiple clients and multiple tenants (each tenant may be associated with multiple clients). The platform 110 is scalable and can support a very large number of clients 106. The clients 106 may be associated with the same tenant or with different tenants. The tenants associated with the platform 110 may each have their own namespace and their own capacity and service level agreements (SLAs) with the platform 110.

The platform 110 includes services 112 and an object store 114. The services 112 may manage, process, or operate with meta-data or with requests that are associated with meta-data while the object store 114 stores the data of the clients. The clients 102 and 104 may store or backup data in the platform 110. The clients 106 may be configured to replicate an entity's data to the platform 110. The clients 106 may be configured to write data directly to the platform.

The clients 106 access the platform 110 via an endpoint 108, which may be a URL. In one example, all clients 106 access the platform 110 via the same endpoint 108 or via a single endpoint 108.

The services 112 may manage or perform tasks associated with meta-data while the data may be stored in the object store 114. The services 112 may be associate with a store used to store meta-data for example. The requests which include metadata or that reference meta-data 116 are handled by the services 112 while the data 118 is directed to the object store 114. The store 114 may be a private, public, or hybrid cloud environment capable of storing data. The clients 106 may communicate with the platform 110 and the platform 110 may communicate with the clients 106.

FIG. 1 further illustrates a platform implementing a distributed file system in a cloud environment. The services may include one or more metadata servers 120 and one or more object stores 114. The clients 106 may be any general purpose computing device. For example, the clients 106 may be a personal computer, workstation, handheld computer, smart phone, and/or tablet computer. Additionally or alternatively, the client 106 may be a software module or application running on a general purpose computing device. The client 106 may be in communication with metadata server included in the services 112 and an object store 114 over a network connection, such as a local area network ("LAN") or wide area network ("WAN"), or via any other form of communication.

The metadata server 120 may be a general purpose computing device managing distributed file system metadata. This metadata could include, for example, the location of data stored in the distributed file system. The metadata server 120 may be a physical or a virtual machine, and may operate in an environment local to or remote from clients 106. For example, the metadata server 120 and the other services 112 may operate in a cloud environment, such as Amazon Web Services ("AWS") or in the same cloud as the object store 114, which may alternatively be in a different cloud.

The object store 114 may include a storage location for storing data in the distributed file system. In some embodiments, the clients 106 may transmit communications to and receive responses from the metadata server 120. Similarly, the clients 106 may transmit communications to and receive responses from the object store 114. Typically these communications will be IO requests and responses, such as read/write communications, though any other type of communication is consistent with the present disclosure.

For example, the client 102 decide to read data from the distributed file system. The client 102 may first send a request to the platform 110 (or to the metadata server 120). In response, metadata server 120 may consult a metadata table to determine data objects locations transmit information related to the data back to the client 102. The data may include a unique identifier for each data object, such as a hash and/or path of the object or a URI to the data object.

In an embodiment, the metadata server 120 maintains location data for all of the data objects in the distributed file system. This location data may be maintained with other data object metadata in a database on metadata server 120. For example, the database may comprise a table mapping a data object to one or more object store locations. These object store locations could reside, for example, on object store 104.

In response to the request received from client 102, the metadata server 120 may consult the database table to determine the object location. The metadata server 120 may then return the object location back to client 102. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system and/or a container on the object store used by the distributed file system, and <object identifier> identifies the object to be read. In an embodiment, the object identifier may be a combination of a hash of the object and a version or unique sequence number of the object.

The client 102 may attempt to access the data object once it receives the data object location from the metadata server 120. If the data object location is a URL, the client may issue an HTTP GET to the URL. For example, the client may issue a GET to object store 114 and/or the cloud service provider holding the data object. In response, the object store 114 may return the requested data object to client 102.

The present system may also be used to write data objects to the distributed file system. This process may be similar to reading data objects, as discussed above. Upon receiving a request to write data, the metadata server 120 (or the services) may consult a database table to determine if the data object (or chunks or portions thereof) have already been placed in an object store, such as object store 114. If the data object (or chuncks thereof) already exists, there is no need to write the existing chunks to the object store a second time. The metadata server 120 may perform this check by comparing the provided object identifier (or chunk fingerprint or hash) to all of the object identifiers in the table. If there is a match, the data object exists. If there is not a match, the data object does not exist.

If the data object already exists in object store 114, the client 102 may not need to transmit the data object (or chunks of the data object) to the store a second time. If the metadata service 120 determines object store 114 does not have a copy of the data object (i.e. the object identifier or chunk identifier is not found in the table), it may create a new entry for the object or chunk. The metadata server may additionally provide an object location back to client 100, and associate this object location with the new table entry. In some embodiments the object location is a URL constructed in the same manner as the URL generated during the read process.

Once the client 102 receives the object location it may write the data object to that location. If the object location is a URL identifying an object store, such as object store 114, the client 102 may write the data to that location using an HTTP POST and/or PUT. The POST and/or PUT request may include the data object client 100 wishes to store on object store 114. In some embodiments the client 102 may conclude that the write was successful after the post was sent and terminate the write process. Alternatively, the client 102 may wait for a confirmation from object store 114 before determining the write was successful.

These file operation semantics and operations are discussed in more detail below.

Figure 2:
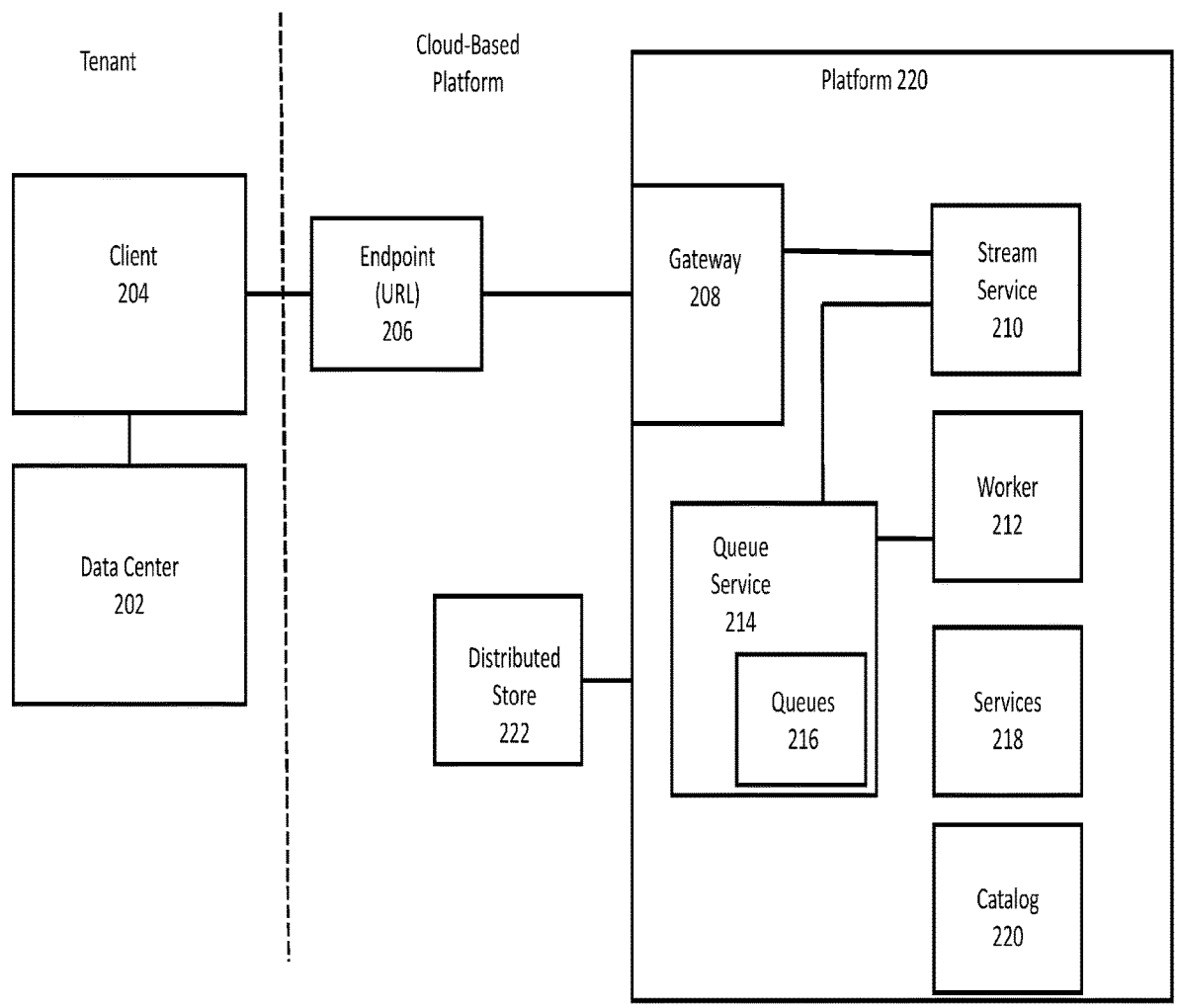
FIG. 2 illustrates an example of an architecture for a cloud based platform.

FIG. 2 illustrates another example of a cloud-based platform 220, which is an example of the platform 110. The platform 220 may support various file system semantics. FIG. 2 illustrates an example of a tenant that may be associated with a data center 202 (or other storage devices or arrangements) and a client 204. The platform client 204 may be responsible, by way of example, for copying data in the data center 202 to the platform 220. Thus, the platform 204 may send requests to the platform 220 via the endpoint 206. Alternatively, data of the tenant could be written directly to the platform 220.

FIG. 2 illustrates a portion of the platform 220 that services or handles requests and meta-data. The data may be processed in a different path as shown in FIG. 1. The platform 220 may handle bookkeeping associated with the data and maintain records, catalogs, or the like. For example, the platform 220 may be used to perform or initiate file operations, deduplication, or the like. The platform 220 may maintain meta-data tables that may include a relationship between a hash of a data object and the location of the data object in the platform. A request for the data may include the hash (or encrypted hash or hash of the encrypted data object). The platform 220 may access the metadata tables (which may be cached) to identify and return the requested data object. The client 204 may send requests to mount data, recover data, write data, change directories, or the like. The platform 220 may include a catalog 220 that is configured to manage and perform the bookkeeping associated with processing these requests.

The platform client 204 may access the platform 220 via an endpoint 206. The platform client 204 may send a request 222 to the platform 220. The request sent by the platform client 204 may be received at a gateway 208. The gateway 208 may pass requests targeted to the platform 220 to the stream services 210. In on embodiments, all requests from client 204 (and all other clients) to the platform 220 take this path. When the request reaches the stream services 210, the platform 220 assumes that the connection comes from a trusted client and that the request and or the client has been authenticated and/or authorized. The service gateway 208 may pass an authorization token to the stream services 210. This may allow the worker 212 to pull in the authenticated principal and tenant information for a given authorization token. The access control list (ACL) associated with the stream that is accessed in or by the worker 212 will ultimately determine whether the operation associated with the request is allowed.

Thus, the client 204 or the request may be authenticated and/or authorized by the gateway 208. The request 222, when authorized and authenticated, is passed to the stream service 210. The gateway 208 may pass some information, such as an authorization token or tenant information, with the request to the stream service 210.

The request 222 may include a package or payload and may include headers. The stream service 210 may forward the request 222 to a queue manager 214 to be placed one of the queues 216, which may include message queues. The stream service 210 forwards the request based on the headers, a verb (e.g., an HTTP verb GET, POST, PUT, DELETE), and/or a target resource. The target resource may be the stream service 210 itself, a particular stream, a chunkmap within a particular stream, or a queue, or the like. The worker 212 (or workers 212) access the queues 216 and perform the requests that are placed therein.

The following examples of requests may identify certain protocols and/or interfaces. Embodiments of the invention are not limited to these examples.

In one embodiment, in order to support massive parallelism and scalability requirements, supported file system semantics may be limited, although embodiments of the invention may fully support file system semantics. In one example, the file system semantics focus on immutable streams.

For example, a client (e.g., a backup agent) requests to backup some streams. Each of these streams will receive a system generated file handle from the platform that may be referred to as a stream ID. This allows data to be written into these streams up until the point that the streams are closed. At this point the stream may be read from anywhere using the stream ID, but no more write operations are allowed in one embodiment. In one embodiment, streams have no name or directory path and this information may be stored elsewhere.

To write a stream a CREATE request is first made with the same credentials as subsequent write requests on that stream. Only a single client can write to a stream. However, it may be possible to leverage multi-threading to write different chunks of the stream concurrently, both in the client and in the server. Every CREATE call will result in a new session, which may survive network connection re-establishment, as well as a new STREAM ID. The session pins the client to server state related to either a series of writes, e.g. WRITE CHUNK DATA or a series of reads READ CHUNK MAP. Sessions may not survive server crashes, but may survive client crashes. The CANCEL request explicitly removes a session.

A CREATE call establishes a session with a particular service back-end instance (e.g., a worker 212). All calls within this session will be routed to the same worker. A session is closed when the stream is closed. A CLOSE call seals the stream. At that point the stream becomes immutable, and can be read from using the STREAM ID and may be served by any available worker. The platform may clean up unsealed streams after a grace period of inactivity (no writes). Sessions are not persisted, so if the dedicated server instance goes down and then comes back up, the session will have to be recreated and data need to be rewritten for the stream. In one embodiment, a distributed garbage collector that will run across all workers and clean up chunks.

A WRITE CHUNK DATA call writes chunks to the stream and a WRITE CHUNK MAP call confirms writes of chunks to the object store. FLUSH puts all in-memory chunk map data on disk. All these three operations are typically performed within the session established with CREATE.

READ operations do not need to establish a session or open the stream, as they are stateless. They may be routed to any available worker (e.g., service back-end instance). However READs use the same STREAM ID that was created with the session that wrote to the stream. The stream has to be sealed to allow for reads.

The semantics of stream DELETE calls is similar to that of READ. The stream must be sealed, the call should include the STREAM ID of the session that wrote the stream, and the request may be served by any worker.

Each stream is associated with a set of attributes that maybe written and read. Attributes may be set both for sealed and unsealed streams. If attributes are set or read for an unsealed stream they need to be part of the CREATE session for that stream. SET and GET ATTRIBUTE calls on sealed streams may be served by any worker. Concurrent SET calls, on the same stream and the same attribute, may not be allowed. The ACL attribute may be set as part of the CREATE call. The CREATE principal will have full access to the stream with no access to anyone else. A GET call returns all the attributes of the stream and their values. SET calls may set any number of attributes. Usually, only a single client will update the attributes at any given time.

These file system semantics are described in more detail below. In one example, a stream is a file, multiple files, a backup set, a portion of a file or backup set or the like or combination thereof. Example requests may include, but are not limited to:

| | |
|---|---|
| CREATE | |
| URL | /stream |
| HTTP Method | POST |
| Description | Creates streams and returns stream Ids and a new session instance. The session instance can be used in subsequent calls to FLUSH, CLOSE, WRITE_CHUNK_DATA, WRITE_CHUNK_MAP, SET_ATTRIBUTES, GET_ATTRIBUTES, READ_CHUNK_MAP. |
| Request Headers | None |
| Request Body | thrift::worker::CompoundRequest with thrift::worker::CreateRequest |
| Response Code | 200 OK |
| | 400 Bad Request if body does not contain a valid thrift::worker:CreateRequest |
| Response Headers | X-Service-SessionInstance |
| Response Body | JSON object with queue field to retrieve thrift::worker::CompoundResponse with thrift::worker:CreateResponse |
| OPEN | |
| URL | /stream |
| HTTP Method | POST |
| Description | Creates a session to read and set attributes of a sealed stream. Internally this operation will behave like NEGOTIATE, SESSION_SETUP, TREE_CONNECT, CREATE in CB. |
| Request Headers | None |
| Request Body | thrift::worker::CompoundRequest with thrift::worker::CreateRequest with name set to stream id returned in a previous CREATE call. |
| Response Code | 200 OK |
| | 400 Bad Request if body does not contain a valid thrift::worker:CreateRequest |
| Response Headers | X-Service-SessionInstance |
| Response Body | JSON object with queue field to retrieve thrift::worker::CompoundResponse with thrift::worker:CreateResponse |
| FLUSH | |
| URL | /stream |
| HTTP Method | POST |
| Description | Targeted at a stream, flushes all in-memory state to disk |
| Request Headers | X-Service-SessionInstance |
| Request Body | thrift::worker::CompoundRequest with thrift::worker::FlushRequest |
| Response Code | 200 OK |
| | 400 Bad Request if body does not contain a valid thrift::worker:FlushRequest |

| | |
|---|---|
| Response Headers | X-Service-SessionInstance |
| Response Body | JSON object with queue field to retrieve thrift::worker::CompoundResponse with thrift::worker:CreateResponse |
| CLOSE | |
| URL | /stream |
| HTTP Method | POST |
| Description | Closes and seals a stream to make it immutable. After the stream is closed it must be opened with the OPEN operation and only READ_CHUNK_DATA, GET_ATTRIBUTES, SET_ATTRIBUTES and CLOSE operations are allowed. |
| Request Headers | X-Service-SessionInstance |
| Request Body | thrift::worker::CompoundRequest with thrift::worker::CloseRequest |
| Response Code | 200 OK |
| | 400 Bad Request if body does not contain a valid thrift::worker:CloseRequest |
| Response Headers | X-Service-SessionInstance |
| Response Body | JSON object with queue field to retrieve thrift::worker::CompoundResponse with thrift::worker:CloseResponse |
| CANCEL | |
| URL | /stream |
| HTTP Method | POST |
| Description | Removes a session |
| Request Headers | X-Service-SessionInstance |
| Request Body | thrift::worker::CompoundRequest with thrift::worker::CancelRequest |
| Response Code | 200 OK |
| | 400 Bad Request if body does not contain a valid thrift::worker:CancelRequest |
| Response Headers | X-Service-SessionInstance |
| Response Body | JSON object with queue field to retrieve thrift::worker::CompoundResponse with thrift::worker:CancelResponse |
| DELETE | |
| URL | /stream |
| HTTP Method | POST |
| Description | Deletes a stream |
| Request Headers | X-Service-SessionInstance |
| Request Body | thrift::worker::CompoundRequest with thrift::worker::SetInfoRequest like in CB use DISPOSITION unlink operation to remove the file |
| Response Code | 200 OK |
| | 400 Bad Request if body does not contain a valid thrift::worker:SetInfoRequest |
| Response Headers | X-Service-SessionInstance |
| Response Body | JSON object with queue field to retrieve thrift::worker::CompoundResponse with thrift::worker:SetInfoResponse |
| WRITE CHUNK DATA | |
| URL | /stream |
| HTTP Method | POST |
| Description | Record new chunks for a stream. Checks whether chunks already exist and returns URIs for chunks to post to object store. |
| Request Headers | X-Service-SessionInstance |
| Request Body | thrift::worker::CompoundRequest with thrift::worker::WriteChunkDataRequest |
| Response Code | 200 OK |
| | 400 Bad Request if body does not contain a valid thrift::worker:WriteChunkDataRequest |
| Response Headers | X-Service-SessionInstance |
| Response Body | JSON object with queue field to retrieve thrift::worker::CompoundResponse with thrift::worker:WriteChunkDataResponse |
| WRITE CHUNK MAP | |
| URL | /stream |
| HTTP Method | POST |
| Description | Writes a chunk map for a stream to confirm object store persistence. |
| Request Headers | X-Service-SessionInstance |
| Request Body | thrift::worker::CompoundRequest with thrift::worker::WriteChunkMapRequest |
| Response Code | 200 OK |
| | 400 Bad Request if body does not contain a valid thrift::worker:WriteChunkMapRequest |

| | |
|---|---|
| Response Headers | X-Service-SessionInstance |
| Response Body | JSON object with queue field to retrieve thrift::worker::CompoundResponse with thrift::worker:WriteChunkMapResponse |
| READ CHUNK MAP | |
| URL | /stream |
| HTTP Method | POST |
| Description | Reads a chunk map for a stream to get object store URIs to fetch |
| Request Headers | X-Service-SessionInstance |
| Request Body | thrift::worker::CompoundResponse with thrift::worker:ReadChunkMapRequest |
| Response Code | 200 OK<br>400 Bad Request if body does not contain a valid Range header |
| Response Headers | X-Service-SessionInstance |
| Response Body | JSON object with queue field to retrieve thrift::worker::CompoundResponse with thrift::worker:ReadChunkMapResponse |
| SET ATTRIBUTES | |
| URL | /stream/{stream-id}/attributes |
| HTTP Method | PUT |
| Description | Sets attributes for a stream |
| Request Headers | None |
| Request Body | thrift::worker::CompoundRequest with thrift::worker::SetInfoRequest |
| Response Code | 200 OK<br>400 Bad Request if body does not contain a valid thrift::worker:SetInfoRequest |
| Response Headers | X-Service-SessionInstance |
| Response Body | JSON object with queue field to retrieve thrift::worker::CompoundResponse with thrift::worker:CreateResponse |
| GET ATTRIBUTES | |
| URL | /stream/{stream-id}/attributes |
| HTTP Method | GET |
| Description | Gets attributes for a stream |
| Request Headers | None |
| Request Body | None |
| Response Code | 200 OK |
| Response Headers | X-Service-SessionInstance |
| Response Body | JSON object with queue field to retrieve thrift::worker::CompoundResponse with thrift::worker:QueryInfoResponse |
| QUEUE | |
| URL | /queue/{queue} |
| HTTP Method | GET |
| Description | Gets a request from the queue |
| Request Headers | None |
| Request Body | None |
| Response Code | 200 OK |
| Response Headers | None |
| Response Body | thrift::worker::CompoundResponse |

Using these requests, by way of example only, the stream services 210 may receive a request and place the request into one of the queues 216. The worker 212 may access the queues 216 and perform the request in the queue 216.

The platform 220 may include other services 218. An AIM service allows the worker 212 to pull in tenant and principal information for a request based on a header received from the gateway 208 (the header may identify the client and/or tenant). This information may be cached for a session. To avoid pulling in this information for each operation on streams, including sealed streams, subsequent requests can be redirected to the same worker.

The services 218 may include a discovery service that functions to look up the endpoints of the AIM service, the queue service 214, and a distributed store 222. A separate instance may be used for each tenant.

The services 218 may also include a heartbeat service. For service health checks, and scaling purpose, the service instances that are currently up and running are tracked. In one example, a Kubernetets liveness ping request may be used. A heartbeat service may also be used to communicate state to various administration tools.

The services 218 may include a logging service. The logging service logs requests received by the platform 220. By way of example, a logging facade such as SLF4J may be used.

The services 218 may also include a distributed store 222. In one example, the distributed store 222 is arranged to include keyspaces (e.g., a tenant isolated scope of a database schema with a series of tables) for different clients. This allows capacity and SLAs to be configured on a per tenant basis.

The services 218 may also include an agent configuration. This include tenant cloud profiles, which may be pulled and used to generate object store URIs from data chunks with the correct paths and credentials.

Figure 3:
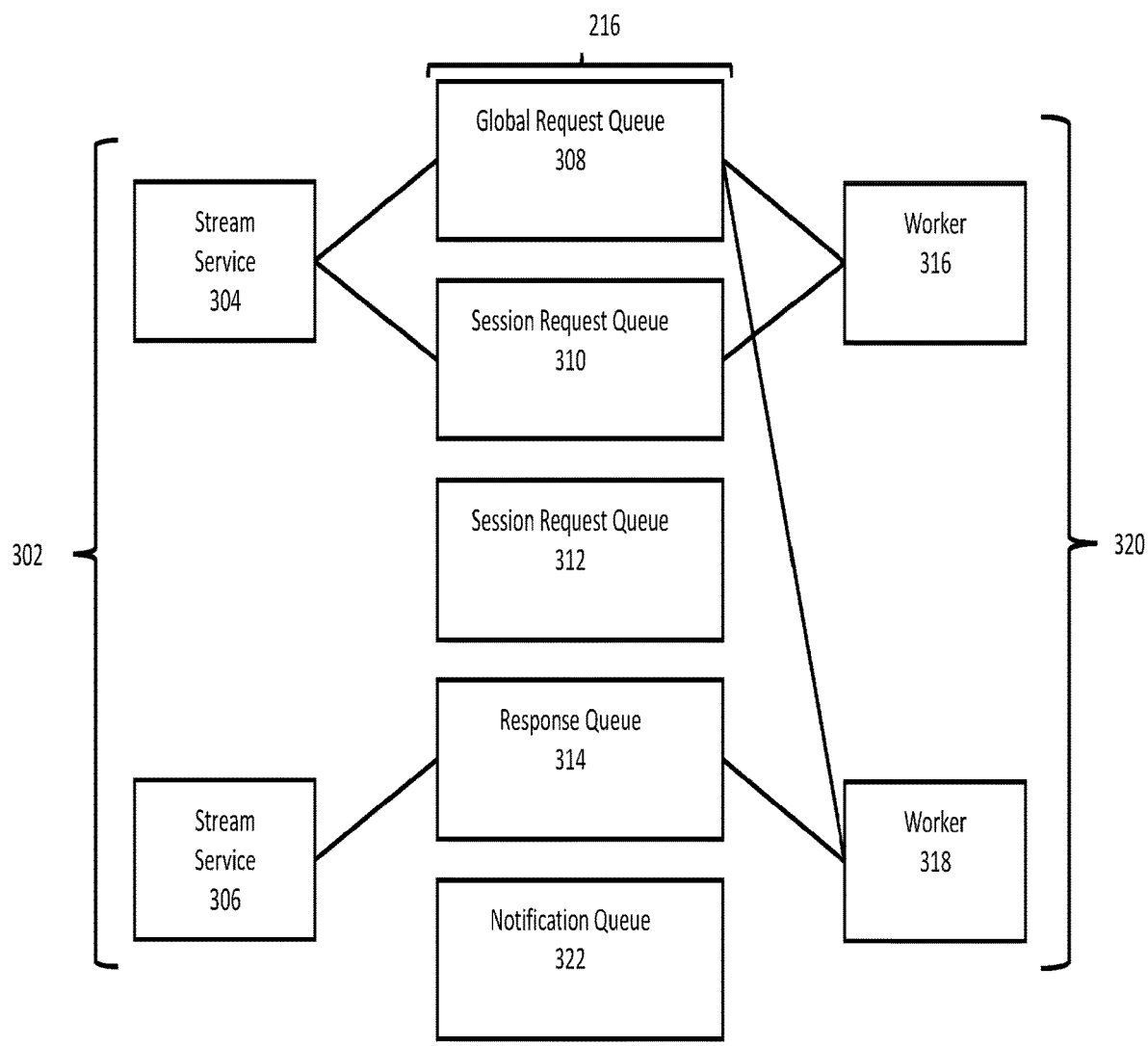
FIG. 3 illustrates a block diagram illustrating the flow of requests in a cloud based platform.

FIG. 3 illustrates an example of the relationships between the stream service, the queues, and the worker in more detail. As part of the scalability, the platform 220 may include multiple stream services 302 such as a stream service 304 and a stream service 306. The platform 220 may also include multiple workers 320 such as worker 316 and worker 318.

FIG. 3 illustrates that the queues 216 shown in FIG. 2 may include multiple queues such as a global request queue 308, a session request queue 310, a session request queue 312, a response queue 314, and a notification queue 322. There may be multiple queues of each of these types.

The global request queue 308 may be used for requests or messages that can be accessed or performed by any of the workers 320. In one example, all of the workers 32 may listen for requests placed in the global requests queue 308. When a new request or message is put in the queue 308, the request will be delivered to or accessed by one of the workers 320. When the request is successfully completed, the request is removed from the queue 308.

The session request queues (e.g., queue 310 and queue 312) are typically associated with a single worker or with a single worker at a time for a particular session. For example, the worker 316 may create a stream as previously discussed in the context of a session. The instance ID of the worker 316 may be associated with or included in the response to the create request. The client may then need to include the session instance in the header of subsequent requests to ensure that the stream service places the subsequent requests in the appropriate queue for the same worker. For example, the worker 316 may be associated with the session request queue 310. All requests or messages in the queue 310 are serviced by the worker 316. Further, the worker 316 may be associated with multiple sessions and, in one example, requests for all of the sessions may be placed in the same queue 310. In this example, only the worker 316 accesses the session request queue 310.

The response queue 314 is used to deliver responses back to the client. Because there may be multiple instances of each type of queue, the stream service may decide which response queue to put the response on before the request is put on the request queue 314. The stream service 302 may then repost this to the client so that the client can access or pull the response from the worker.

The queues may also include a notification queue 322. This queue may be used to notify all of the workers 320 of an event, such as an upgrade, to stop all workers from processing new requests, or for other reasons.

FIG. 3 thus illustrates that the stream services 302 can place requests in any of the queues 216 and that the workers 320 service the requests in the queues 216.

Figure 4:
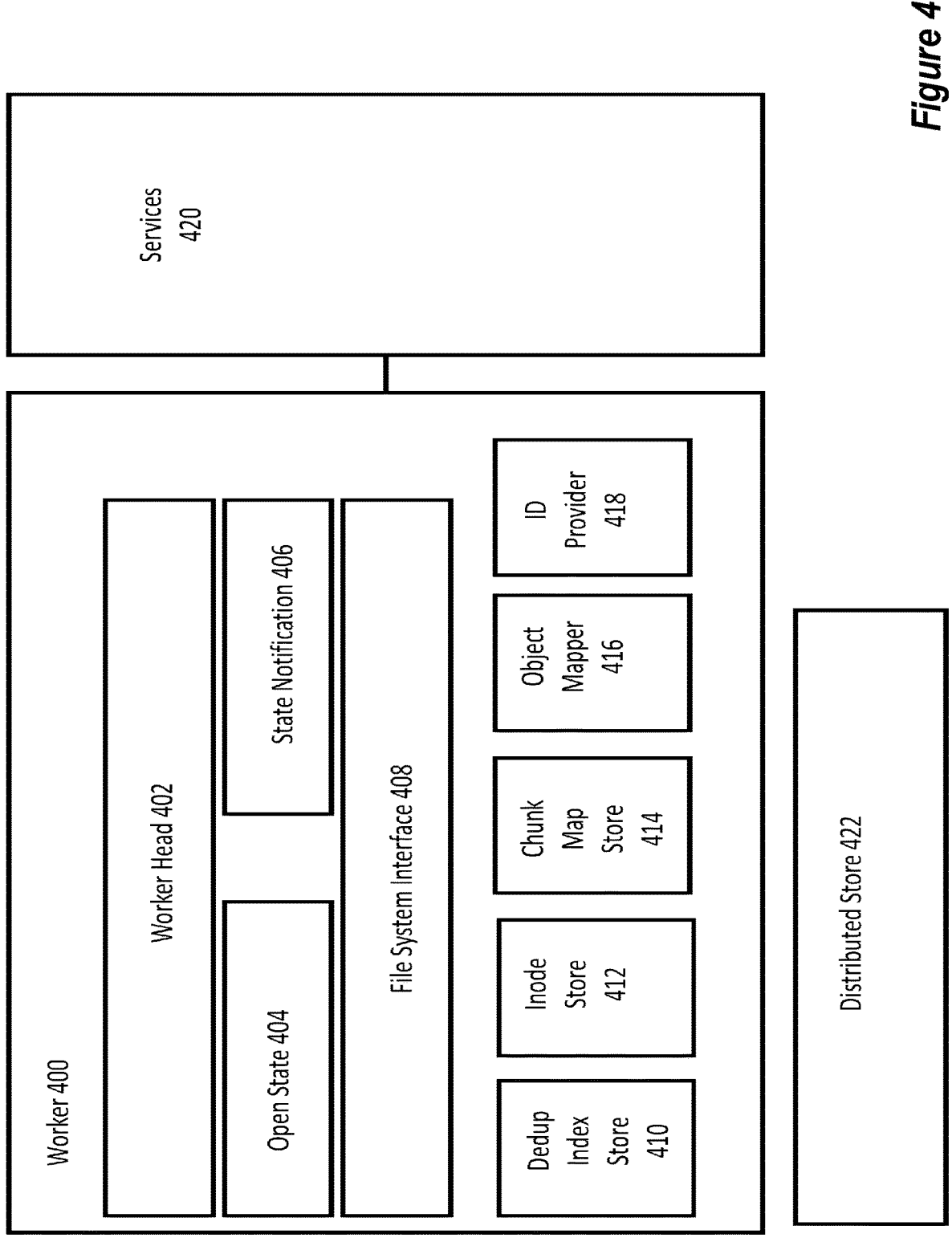
FIG. 4 illustrates an example of a worker that executes or performs requests received in a cloud based platform.

FIG. 4 illustrates an example of a worker 400. In one embodiments, all requests performed by the worker 400 are pulled from one of the queues 216 and responses are written back to the queues 216 (e.g., the queue 314). It may be possible to use, for example, HTTP, but this is not a requirement. The requests typically include a payload and have a protocol structure.

When servicing a request, the worker head 402 retrieves the payload from the request and executes the relevant code of the code after verifying, if necessary and if applicable, a potential session state. An open state 404 is maintained while, for example, writing chunks to a stream. The state may not be persisted. For a particular session, however, all requests for a session go through the same worker or worker instance. The state notification 406 may be used to notify clients that a stream is ready to be read or recovered. This may include writing an event to the notification queue.

The filesystem interface 408 connects the worker with a persistent store. In one example, embodiments of the invention bypass stateful operations related to inode hierarchy and locking and become more of a pass through to external scale-out storage.

The worker is associated with or has access to a dedupindex store 410 through the filesystem interface 408. In the context of deduplication, looking up whether a chunk has been seen before based on a content hash is one of the most expensive operations in the stream write path. The dedupindex store 410 relates a content hash to a chunk id. By comparing a hash to the index, one can determine whether the chunk has been previously seen or stored in the platform. If the index can fit in memory, this is a quick operation. However, as the capacity of the namespace grows, these lookups may be served from disk. Embodiments of the invention scale out and distribute this index into a distributed cache in one embodiment.

In one example, a LRU policy may be used. Time locality or stream id locality may be leveraged to pull in data more intelligently into memory. For example, if some random chunks are used for index within each stream, then matches within this sample could determine whether all chunks for that stream should be pulled into memory to deduplicate the current stream. Bloom filters may be used as well.

How well deduplication processing works and what the distribution in popularity is over chunks and over streams is something the platform may track and report through a stats service. The optimal chunk size and caching strategy based on workload may be auto-tuned over time.

The filesystem interface 408 can persist data in scale out stores like a distributed store 422. The chunk map store 414 is responsible for reading and writing the chunk map of a stream and setting chunk meta-data. The chunk map store 414 should also mark chunks based on whether they have been successfully written to an object store. The stream will be fully recoverable if the complete chunk map for the stream is known. Thus, as long as the chunk map is persisted and accessible from any worker, any server instance may serve stream read requests. The stream ACL may also be persisted in the chunk map store 414 in one embodiment, as well as any other extended attributes of the stream. Thus the chunk map store 414 takes care of all the persistence associated with both streams and chunks.

The inode store 412 is responsible for loading and storing the meta data associated with the stream. In one example, this may include the stream meta data collocated with the chunk map data. In one example, the dedup index, inode and chunk map stores may be APIs used by the workers or by a worker service. They may be physically stored in a series of database tables to optimize writes and reads. Some of the data may for instance be duplicated in multiple tables to make reads faster. Conversely some data may have to be read from multiple tables to make writes faster.

The object mapper 416 component of the worker is responsible for generating URLs for chunks. Given a chunk Id and a configured object store in the tenant's or customer's cloud profile, the object mapper 416 will be able to provide the full URL to do PUT and GET on to retrieve the actual chunk data. This also involves getting to the credentials of the object store. The cloud profile configuration needs to be pulled and cached from the agent configuration service to allow chunk URL mapping requests to be served efficiently from memory.

The services as previously discussed include, by way of example and not limitation, a stream service, a worker, an ID range provider, a Stats service, and data services. The data services may include a set of services that operate on data written into persistent storage by the platform or a component or service thereof.

All requests to the platform go through the gateway 208. The gateway 208 will authenticate and authorize all requests before selecting a stream service to execute the request. The gateway 208 may pick any one of the stream services 210 to service the request regardless of whether the call or request is within a session (before sealing the stream) or outside a session (after sealing the stream).

The stream service 210 places the request on an appropriate message queue, and then pull the request from another queue, possibly after returning a handle to the client, in the case of an asynchronous (non-blocking) request. The stream service typically only looks at the REST path and headers. The payload is passed through to the queue as is. The stream service 210 also passes through logging correlation ids and authentication tokens denoting the authenticated user.

In one embodiment, the worker 212 does not expose an API (except, in one embodiment, for a liveness ping API) but listens for requests on one or more logical queues. The queues may be used to broadcast events to all worker, first available worker, or a specific worker. The worker implements the OP codes supported by the platform, such as CREATE, WRITE_CHUNK_DATA, WRITE_CHUNK_MAP, FLUSH, CLOSE, DELETE, READ_CHUNK_MAP, GET_ATTRIBUTES, SET_ATTRIBUTES. The worker 212 interacts with the data store backend to persist the chunk and stream meta-data and to query for deduplicated chunks.

The ID Range Provider service generates ranges of sequence numbers that are globally unique within an ID scope. This is a microservice that exposes mysql sequence like functionality across a distributed set of services. The platform will utilize this service to allocate Chunk IDs to make sure that chunks allocated for a single stream are likely to end up the in the same chunk range partition in the data store. The ID scope in this case is CHUNK and all services deployed in platform within that scope must ensure that they do not hand out overlapping IDs ranges.

Data services scan the distributed stores where the workers persist the meta data. These services may run outside of the main application flow on a regular basis or on-demand based on some admin configuration or control commands. Data services may include a stream garbage collector service that cleans up expired unsealed streams, a data scrubber service that cleans up unused chunks in the object store, and the statistics collector service, which collects and computes various statistics on deduplication performance.

The stream service 210 may offer a REST API (request) to the platform, which may be called by clients. This API is stateless and provides both synchronous and asynchronous call semantics. The payload of the request may be encoded as a binary package. In one embodiment, the stream service never deserializes the package, but instead forwards the package to a message queue, based on information in the headers, the HTTP verb and the target resource, denoted by the URL path.

For HTTP GET operations there is no payload in the requests, and the service long polls requests off a message queue. HTTP POST, PUT and DELETE requests may return the result in the HTTP response body or send a redirect to a queue to pull the response from, similarly to the HTTP GET operations. These operations are furthermore implemented to be idempotent.

Modifying operations on streams need to be called within a session on an unsealed stream, whereas the HTTP DELETE call may be called outside of a session on a sealed stream. However, the ACL attribute may be set on sealed streams.

By way of example and not limitation, the base URL or endpoint for the request (REST API) is {PLATFORM END-POINT}/platform/vx.xx. All methods may use HTTP/1.1 POST methods and may add a header X-Platform-Blocking set to "true" to receive a response inline, but by default the result will be a queue that needs to be used to send a HTTP GET to retrieve the response. POST methods may also add the header X-Platform-ReplyTo to specify which queue to put the response on.

The CREATE operation will create a stream and return the SessionInstance in the HTTP Response header X-Platform-SessionInstance where that stream was created in the payload. This instance id needs to be passed as a HTTP Request header X-Platform-SessionInstance for all the operations except CREATE and OPEN. The OPEN operation works similarly to CREATE but requires a persistent stream id as input. A stream opened in this way only allows read and attribute related methods READ, CLOSE, GET_ATTRIBUTES, SET_ATTRIBUTES.

The stream services 210 communicate with the worker 212 using a series of queues 216. With reference to FIG. 3, all workers listen on the global request queues 208 for requests, and when a new request is put on the queue 308, the request is delivered to one worker. If this worker processes the request successfully it will be removed from the queue. This type of queue is used for the CREATE, DELETE, READ_CHUNK_MAP, SET_ATTRIBUTES, and GET_ATTRIBUTES operations.

A Session Request Queue is a type of queue that only a single worker instance pulls work from. This design assures that requests within the same session are routed to the same worker (e.g., worker instance). The worker that creates a stream associates it with its own instance ID as part of the create response. The client then needs to pass the X-Platform-SessionInstance header to allow the stream service to put the request on the appropriate session request queue. Note this header is not the same as the Session Id. Many sessions may exist at the same time within a worker and they will all use the same session request queue in one embodiment, although the platform could be configured to allow a single session request queue for each session. Because the session disappears when the worker goes down, there is no need to leave the message on the queue if processing fails as in the global request queue case.

A response queue 314 is used to deliver the response back to the client. The stream service 302 decides which response queue to put the response on before the request is put on a request queue. The message enqueued will hold the response queue identifier so the worker knows which queue to put the response on. The stream service may expose this back to the clients who can then pull the response using the QUEUE operation. Alternatively, the stream service that puts the request on the request queue can pull the response as well from the response queue before returning it to the calling client.

The queues may be separated on different hosts and with different exchanges for different tenants to allow performance isolation. The same host and exchange may model many different queues with hierarchical topic subscriptions. For requests this could be leveraged as follows.

A worker could subscribe to queue topics "worker.global" and "worker.{instance-id}". Similarly a client may choose to pull responses for all its requests with queue topic "{client-id}.*" or for a particular stream "{client-id}.{stream-id}.*" or for a specific request on a stream "{client-id}.{stream-id}.{response-id}".

Figure 5:
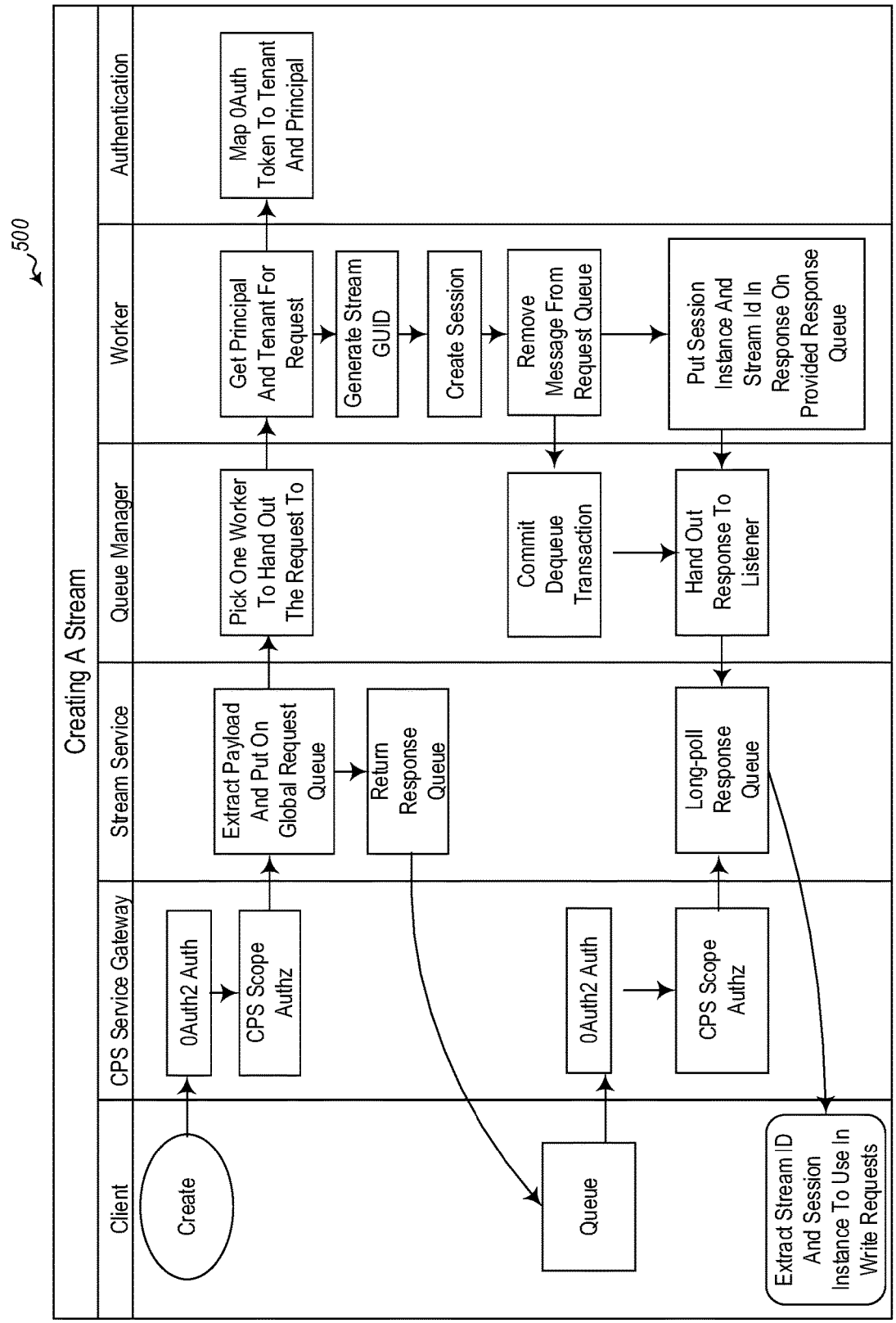
FIG. 5 illustrates an example of creating a stream and illustrates meta-data services associated with creating a stream.

FIG. 5 illustrates an example of a method 500 for creating a stream. The client issues a CREATE call with no other input parameters other than the security credentials. Optionally, the client may specify how many streams to create in order to batch requests. The output is a StreamId that allows the client to write to the stream. The client also needs to extract a SessionInstance, a unique Id tied to the worker that fulfilled the request, to make sure the subsequent write requests are routed correctly. The actual session id may be embedded in the payload and may not be visible to anyone but the client and the worker that created the session. The authentication gateway lookup may be cached or embedded in the session state to avoid write requests having to go through this step again.

Figure 6:
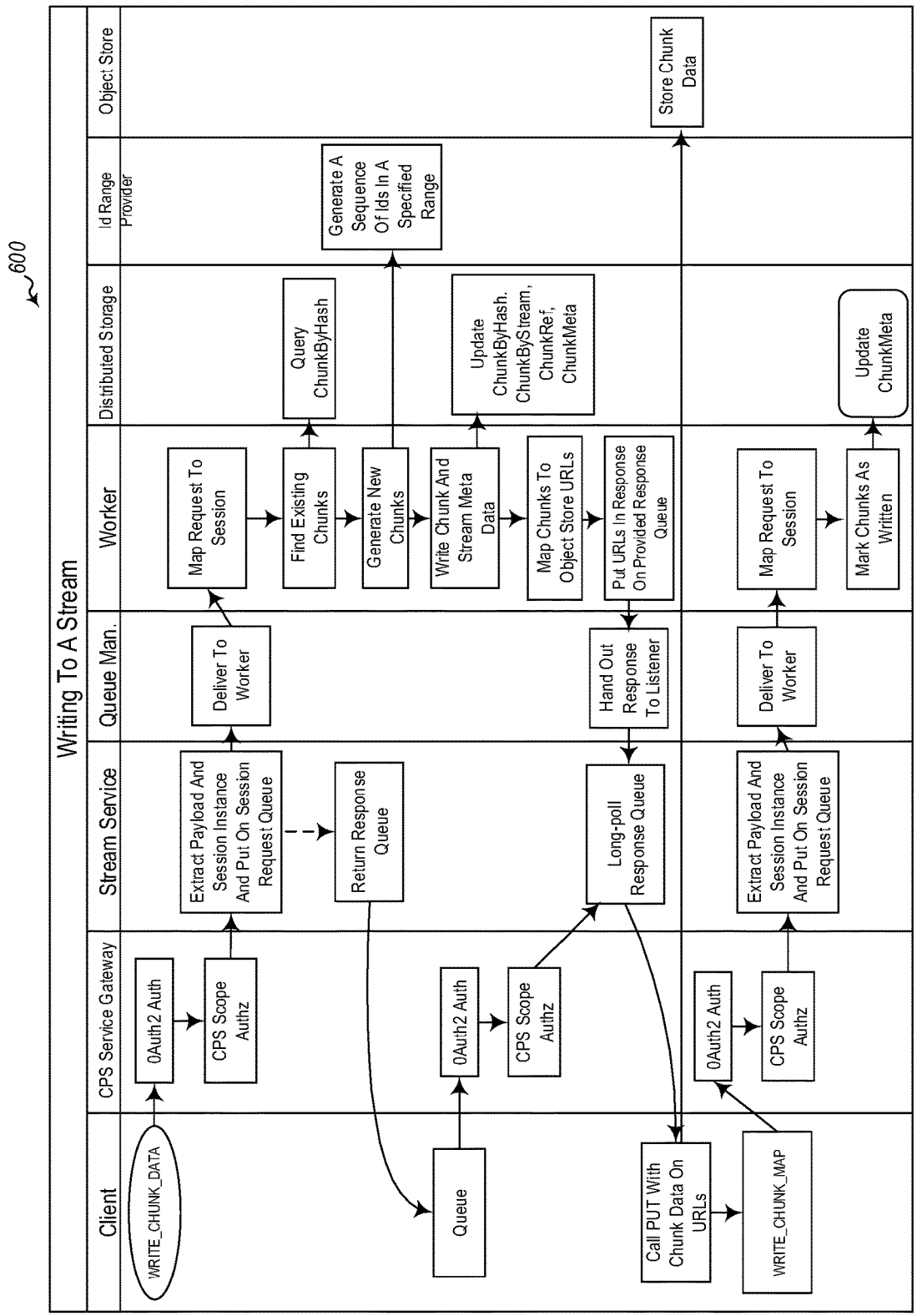
FIG. 6 illustrates an example of a method for writing to a stream and meta-data services associated with writing to a stream.

FIG. 6 illustrates an example of a method 600 for writing to a stream. To write to a stream, the platform is called to determine which chunks are already in the platform in one embodiment. New URLs are returned so that the data can be written to the object store (e.g., using HTTP PUT). Once the object store confirms that the chunks are persisted, the platform updates the chunk meta data. Some of these steps or acts may happen concurrently for different offset ranges within a stream.

When the flush operation returns, there is a guarantee that the chunk data are persisted up to a particular offset. If the stream is not sealed, the client may still have to rewrite the chunks from the beginning. The flush point can be queried using the GET_ATTRIBUTES call. The FLUSH call follows the same path through the system as the WRITE_CHUNK_DATA call and simply waits for all the chunks to be persisted up to a certain offset before sending the response back to the client.

When a stream is closed, the stream is flushed and sealed and made available for reading. The session state is also cleaned up. The CLOSE path through the system is similar to the WRITE_CHUNK_DATA path, given that it also requires a session.

Reading from a stream in the platform does not require a session and the READ_CHUNK_MAP call may be served by any worker. After the READ_CHUNK_MAP call has returned all the URLs for the chunks in the stream, the client issues a HTTP GET on these chunks on the Object Store.

Streams may be deleted, and similar to reads, deletes do not require a session, so they take the same path as CREATE calls though the system and may be served by any worker. The DELETE call may be idempotent, so if called multiple times it has no side effects.

In one embodiment, streams must be internally consistent in order to support reliable recovery. Consistency may be ensured on three levels, stream semantics, protocol and finally on the data store level. We will discuss these in turn.

From the point of creating a stream, to the point that the stream is successfully closed and sealed, the stream (chunk map) may not be read. Given that only a single writer is allowed in one embodiment, the internal concurrency can also be controlled to account for consistent meta data such as stream size. When a stream has been sealed, the stream can be read, deleted, and attributes such as ACL can be changed. For these changes a latest-writer-wins (LWW) semantics may be used. No locks will be taken but only the session that created the stream will be able to write chunks to it.

Streams are written using the WRITE_CHUNK_DATA (WCD) and WRITE_CHUNK_MAP (WCM) operations. WCD writes chunks to the chunk map of a stream. The individual chunk map entries may be written concurrently without loss of consistency as long as the offsets are not overlapping. WCM will flag chunks as written to the object store and they can thus be reliably used inside of streams. There is also a FLUSH call that can guarantee that all chunks written up until that point are persisted into the store layer. The FLUSH call is made asynchronously and a callback can be received when the operation completes, at which point the guarantees hold. The CLOSE call will seal the stream as previously mentioned, and this operation guarantees that all the chunks are written to and can be recovered because after this point WCD and WCM operations are no longer allowed for the stream. Streams that are not sealed will be garbage collected after some grace period. Chunk ref counting will be performed but it will also be controlled with garbage collection, as this is one operation to the data store that cannot be made idempotent. One possibility is to keep the true ref count for a chunk locally in a worker mysql database and then in a garbage collection step clean up inconsistencies.

Transactional consistency can also be leveraged to varying degrees. Cassandra is, by way of example and not limitation, an example of a distributed store. Light-weight transactions provide the strongest guarantee, and also involve the highest overhead as a full consensus protocol (e.g., PAXOS) is run behind the scenes. From a client's perspective a light-weight transaction is invoked by simply adding an IF clause to the CQL to guarantee that the operation fails if the condition is not true. This mechanism could potentially be used to lock streams.

BATCH requests may be used to guarantee that all contained requests will be performed and recorded with the same timestamp. A BATCH commit log is used to cope with partial updates in the event of crashes. This could be disabled if batching is only used to compound requests within a partition, but then the transactional guarantees go away.

Both writes and reads may specify a per-call consistency level. The exact semantics (and overhead) depends on the replication level.

Figure 7:
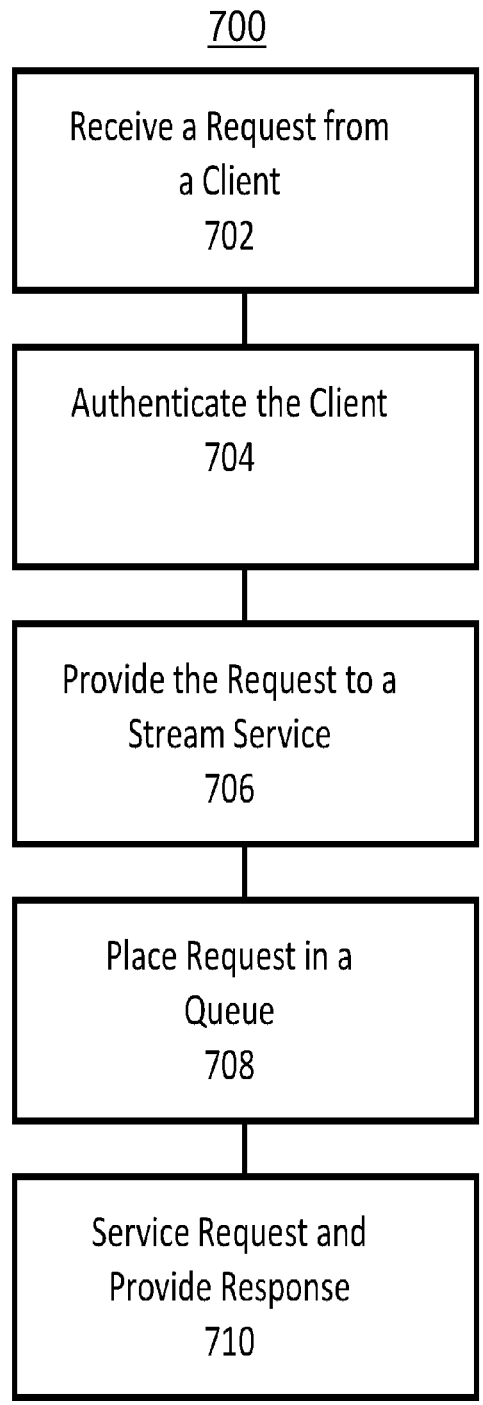
FIG. 7 illustrates an example of a method for providing meta-data services in a cloud based platform.

FIG. 7 illustrates an example of a method for protecting data in a cloud based platform. The method 700 may begin when a request is received from a client in box 702. The client (or tenant) is authenticated in box 704. The request is then passed or provided to a stream service in box 706. The stream service may then place the request in a queue in box 708. The request is placed in a queue based on headers included in the request. Some requests may be placed in a global queue that can be service by any worker. Other requests may be placed in session queues that are specific to a particular worker. Responses to the requests are placed in a response queue in box 710 and can be accessed by the client.

The method 700 may allow for directory or file operations, stream recovery, creation, deletion, and the like. The method 700 relates to the meta-data and the actual data may follow a different path.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting data in a distributed file system, the method comprising:
    receiving a request at a metadata service that is configured to manage metadata for data stored in cloud storage;
    evaluating a header associated with the request; and
    placing the request in one of a plurality of queues based on the header, wherein the plurality of queues include a global request queue, a session request queue, a response queue, and a notification queue;
    servicing the request by workers that are configured to service requests in the global request queue and the session request queue, wherein the request identifies an action to perform on a data object stored in the distributed file system;
    notifying the workers about events in the notification queue; and
    delivering a response in the response queue, wherein the response includes returning an object location to a client based on the header, wherein the object location allows the client to perform the action on the data object.

2. The method of claim 1, further comprising placing the request in the global request queue or in the session request queue.

3. The method of claim 1, wherein the events include at least one or more of upgrades, notification regarding streams ready to read, or notifications regarding streams ready to be recovered.

4. The method of claim 1, wherein the request is related to writing a backup stream to an object store.

5. The method of claim 1, wherein the request is related to reading a backup stream from an object store.

6. The method of claim 2, wherein the workers are configured to service the plurality of queues.

7. The method of claim 2, wherein each of the workers is associated with a different session request queue and wherein any of the plurality of workers can service the global request queue.

8. The method of claim 1, further comprising handling data associated with the request separately from metadata associated with the request.

9. The method of claim 1, further comprising receiving the request at a gateway service through an endpoint, wherein all requests pass through the endpoint.

10. The method of claim 1, further comprising, when servicing the request, retrieving a payload from the request and executing associated code after verifying a potential session state.

11. The method of claim 1, further comprising performing the request and placing a response in a response queue that is configured to be accessed by the client.

12. A non-transitory computer readable medium comprising computer executable instructions for performing a method for protecting data in a distributed file system, the method comprising:
    receiving a request at a metadata service that is configured to manage metadata for data stored in cloud storage;
    evaluating a header associated with the request; and
    placing the request in one of a plurality of queues based on the header, wherein the plurality of queues include a global request queue, a session request queue, a response queue, and a notification queue;
    servicing the request by workers that are configured to service requests in the global request queue and the session request queue, wherein the request identifies an action to perform on a data object stored in the distributed file system;
    notifying the workers about events in the notification queue; and
    delivering a response in the response queue, wherein the response includes returning an object location to a client based on the header, wherein the object location allows the client to perform the action on the data object.

13. The non-transitory computer readable medium of claim 12, further comprising placing the request in the global request queue or in the session request queue.

14. The non-transitory computer readable medium of claim 12, wherein the events include at least one or more of upgrades, notification regarding streams ready to read, or notifications regarding streams ready to be recovered.

15. The non-transitory computer readable medium of claim 12, wherein the request is related to writing a backup stream to an object store.

16. The non-transitory computer readable medium of claim 12, wherein the request is related to reading a backup stream from an object store.

17. The non-transitory computer readable medium of claim 12, wherein the workers are configured to service the plurality of queues.

18. The non-transitory computer readable medium of claim 17, wherein each of the workers is associated with a different session request queue and wherein any of the plurality of workers can service the global request queue.

19. The non-transitory computer readable medium of claim 12, further comprising handling data associated with the request separately from metadata associated with the request.

20. The non-transitory computer readable medium of claim 12, further comprising, when servicing the request, retrieving a payload from the request and executing associated code after verifying a potential session state and performing the request and placing a response in a response queue that is configured to be accessed by the client.

* * * * *